United States Patent Office

2,854,664
Patented Sept. 30, 1958

2,854,664

BEARING INDICATOR

George V. Rodgers, California, Md., assignor to the United States of America as represented by the Secretary of the Navy Application September 24, 1956, Serial No. 611,797

5 Claims. (Cl. 343—102)

(Granted under Title 35, U. S. Code (1952), sec. 266)

The invention described herein may be manufactured and used by or for the Government of the United States of America for governmental purposes without the payment of any royalties thereon or therefor.

The present invention relates to a bearing indicator and more particularly to a bearing indicator which provides azimuth information in a receiver. This application for patent is a continuation-in-part of application Serial No. 575,290, filed March 30, 1956.

In the azimuth indicating system disclosed in application Serial No. 575,290, a "synchronizer" at a transmitting station utilizes pulse type equipment to generate pulse trains containing information that define each azimuth bearing. A "bearing indicator attachment," connected to an existing receiver, transforms the received bearing information to a dial indication of azimuth. The present invention is an improvement over the bearing indicator component of the azimuth indicating system of application Serial No. 575,290, in that a more accurate azimuth reading is obtained in the present system by means of a vernier or multiple speed data system which more accurately transforms the information contained in the received pulse trains into a dial indication.

Accordingly, an object of the present invention is the provision of a receiver for transforming received pulse information into a dial indication.

Another object is to provide a bearing indicator for converting azimuth information contained in a received pulse train into a dial indication of azimuth.

A further object of this invention is the provision of an azimuth indicating system which utilizes a multiple speed data system to increase accuracy.

Figure 1:
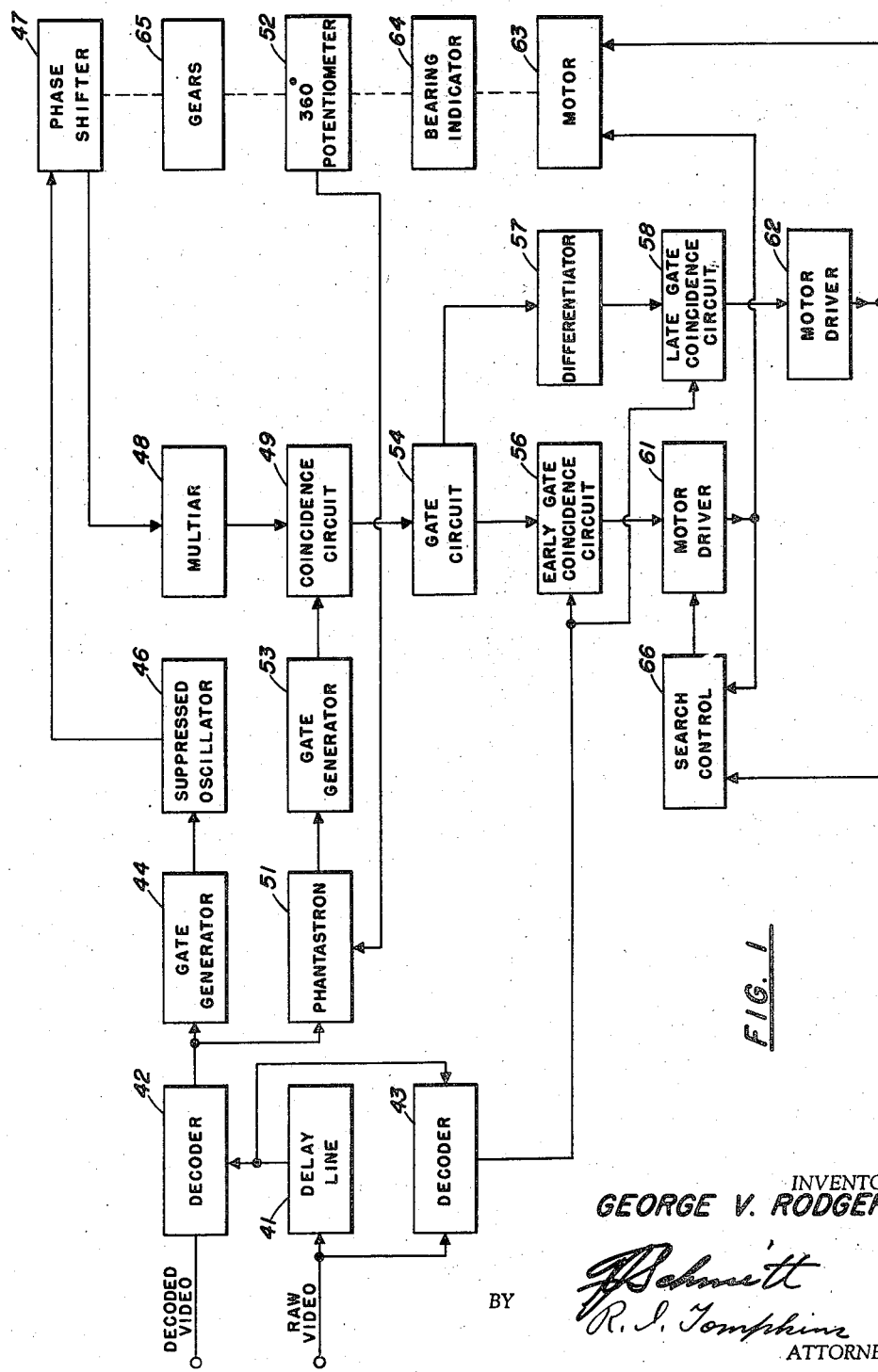
Figure 2:
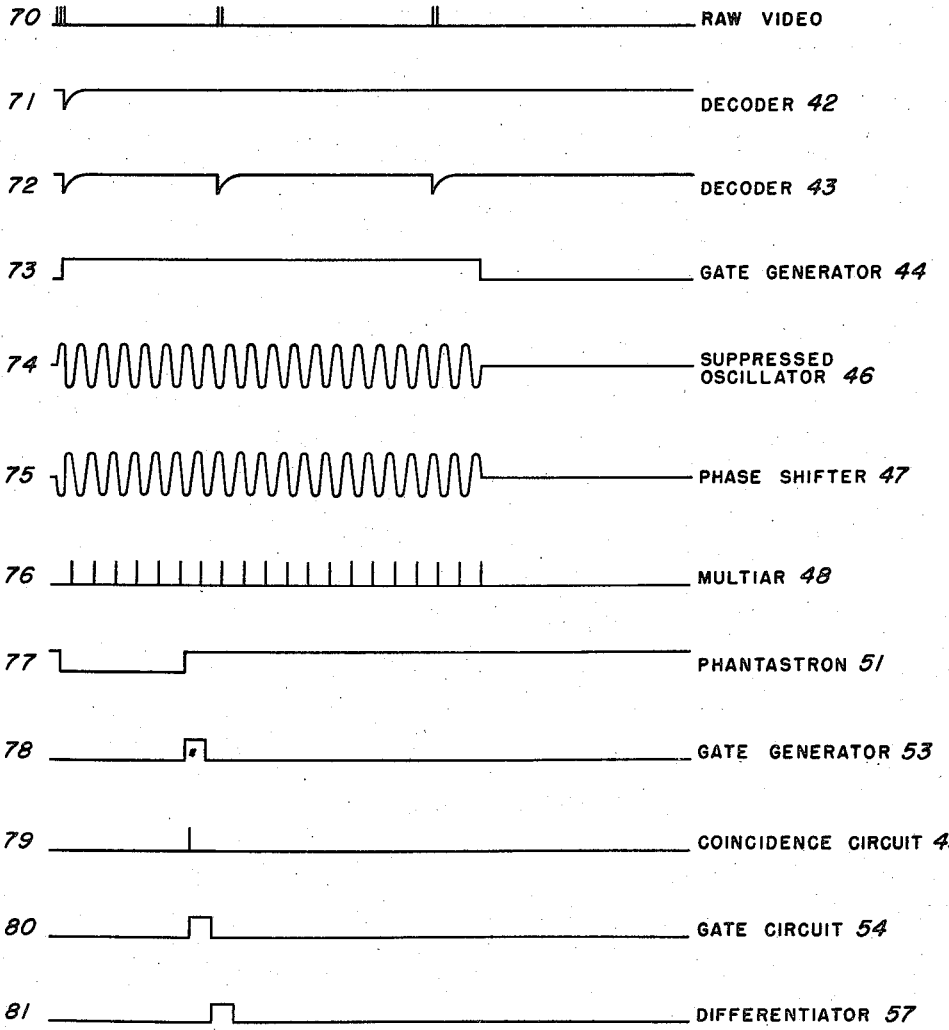

Other objects and many of the attendant advantages of this invention will be readily appreciated as the same becomes better understood by reference to the following detailed description when considered in connection with the accompanying drawings wherein:

Fig. 1 shows a block diagram of a preferred embodiment of a bearing indicator, and Fig. 2 is a graph illustrating the output voltage wave forms produced by various components of the block diagram of Fig. 1.

Referring now to the drawings, the pulse train transmission from a bearing synchronizer, such as the synchronizer disclosed in copending application Serial No. 575,290, is received by the airborne (or shipborne, etc.) DME (distance measuring equipment) interrogator unit (not shown) which decodes the spacing of the reference pulse group (a characteristic of the DME channel). The bering pulse train transmission, shown as wave 70 of Fig. 2, comprises three reference pulses followed by two groups of bearing pulses having two pulses in each group. The spacing between the first and third pulse of the reference pulse group identifies the transmitting station and is the same as the DME reply pulse spacing on the same frequency channel. The spacing between the second and the third pulse of the reference pulse group and between the pulses of each bearing pulse group is less than the shortest DME pulse spacing and is used for decoding purposes. In the bearing indicator shown in Fig. 1, the raw video (wave 70 of Fig. 2) from the DME is conducted to delay line 41, which has a delay characteristic equal to the period between the pulses of a pulse pair of the bearing pulse group. The output from this delay line is conducted to an input of decoder 42 which has another input fed by the decoded video from the DME. When the proper triple pulse group is received by the DME, the third pulse from the decoded video and the second pulse from the output of delay line 41 coincide and a single pulse is produced at the output of decoder 42. The operation of decoder 43 is similar to that of decoder 42 except that delayed and undelayed raw video are applied to the inputs of the decoder 43 so that all pulse pairs are decoded; that is, the first delayed pulse of a pulse pair and the second undelayed pulse of the same pulse pair coincide to produce a single pulse at the output of decoder 43. Referring again to decoder 42, its output is coupled to trigger gate generator 44 to generate a gate of sufficient duration to include the time separation of the reference and bearing pulses for any azimuth from the ground station. This gate enables oscillator 46, which produces a high frequency sine wave. This sine wave output is phase shifted by a shaft mounted resolver or capacitor phase shifter 47 and fed to multiar 48 which produces one output pulse each time the input sine wave passes through a certain portion of its cycle; for example, zero degrees in the negative direction. Multiar 48 is a pulse generator of the type described on page 345, volume 19 of the Radiation Laboratory series titled Waveforms, edited by Britton Chance et al. (McGraw-Hill, 1949). The pulse output of multiar output 48 feeds one input of coincidence circuit 49. The other input to coincidence circuit 49 is generated by a circuit that includes phantastron 51 which has two inputs one of which is fed by the output of the decoder 42 and the other of which is fed by the output of the shaft mounted 360° potentiometer 52. Phantastron 51 initiates a square wave pulse upon being triggered by a pulse output from decoder 42 and the duration of this square wave pulse is determined by the setting of potentiometer 52. This square wave pulse energizes gate generator 53 which upon the termination of the square wave pulse produces a short gate of no longer duration than the period of the output wave from oscillator 46. This gate is fed to an input of coincidence circuit 49 and is used to enable one pulse from the output of multiar 48. Gate circuit 54 initiates an early gate pulse upon being pulsed by a pulse from coincidence circuit 49. The gate coincidence circuit 56 which is fed by this early gate and also by the decoded bearing pulses from decoder 43 passes the decoded bearing pulses that are coincident with this early gate. This early gate is fed also to differentiator 57 which differentiates it to form a late pulse that is fed to late gate coincidence circuit 58. This latter coincidence circuit is fed also by bearing pulses from decoder 43 and thus passes bearing pulses that are coincident with this late gate. The pulse outputs from coincidence circuits 56 and 58 are utilized by motor driver circuits 61 and 62, respectively, to operate motor 63. Motor driver circuit 61 converts the output pulses from circuit 56 into the proper form to energize the field windings of motor 63 to cause the armature of this motor to rotate in one direction and motor driver 62 forms the pulses from circuit 58 to energize field windings of this motor to cause the armature to rotate in the opposite direction. The armature of motor 63 is joined by a shaft to the bearing indicator 64, potentiometer 52 and through step-up gears 65 to phase shifter 47. Thus, the rotation of the armature of motor 63 rotates the bearing indicator 64, and the movable element of potentiometer 52, the latter of which causes the short gate generated by phantastron 51 and gate generator 53 to move in time with respect to the reference pulse over a range in one rotation of the indicator dial of bearing indicator 64 determined by the voltage output of potentiometer 52 and the characteristics of phantastron 51. Thus, the pulse from multiar 48 that is enabled in coincidence circuit 49, also moves over this range and causes the early gate from gate circuit 54 to be initiated at different times. As the time of occurrence of the early gate from gate circuit 54 is varied, some of the bearing pulses from decoder 43 fall in the early gate and others in the late gate. The speed and direction of motor rotation is determined by the difference in the number of output pulses from drivers 61 and 62 which is controlled by the number of pulses falling in the early and late gates, respectively. As a result, at very nearly the correct bearing, the armature of motor 63 rotates more slowly and finally stops at a point that corresponds to the reception of an equal number of pulses from coincidence circuits 56 and 58. In the absence of bearing information, search control 66 operates on motor driver 61 to allow current to flow through one field winding of motor 63 to cause a continuous rotation of the bearing indicator thereby informing the operator that there is no bearing information.

The operation of the bearing indicator system of Fig. 1 perhaps can be more readily comprehended by reference to the voltage wave forms shown in Fig. 2. As previously explained, wave form 70 is the raw video that is fed to delay line 41. The decoded video fed to decoder 42 has not been illustrated in Fig. 2, since it would consist of only a single pulse which would occur coincident with the last pulse of the triple pulse group of wave form 70. Wave form 71 is the reference pulse output of decoder 42 which is generated upon the reception of a single pulse by decoder 42 and a triple pulse group by delay line 41. Wave form 72 is the output of decoder 43 and comprises individual pulses each of which is produced upon the reception of pulse pairs in the received pulse train. Wave form 73 is a square wave generated by gate generator 44 when triggered by wave 71 and as previously mentioned is of sufficient duration to include the time separation of the reference and bearing pulses of wave form 70 for any azimuth from the ground station. Sine wave 74 is the output from oscillator 46 when it is enabled by square wave 73. Sine wave 75 is sine wave 74 as shifted by phase shifter 47 in proportion to the rotation of a movable element in phase shifter 47 which rotation is caused by the output of gears 65. Multiar 48 of Fig. 1, produces a pulse of wave form 76 each time wave 75 goes through a certain portion of its cycle, here shown to be zero degrees in the negative direction. Wave form 77 is a square wave generated by phantastron 51 when triggered by a reference pulse from decoder 42 and as previously mentioned this square wave has a length that is determined by the setting of potentiometer 52. Upon the termination of the square wave 77, generator 53 generates the short delayed gate wave 78 which has a period that is no longer than the period of the pulses of wave form 76 and thus ensures that each gate pulse of wave 78 enables no more than one of the multiar pulses. The pulse of wave form 79 is the pulse which is enabled by gate 78 in coincidence circuit 49. Wave form 80 is the early gate that is generated in gate circuit 54 upon being triggered by pulse 79 and wave form 81 is the late gate generated by differentiator 57 of Fig. 1 through differentiation of wave 80.

The function of the bearing indicator of Fig. 1 is of course to produce a bearing indication on bearing indicator 64 that has a known relationship to the time separation between the received reference and bearing pulse groups. Thus, the bearing indicator 64 can be calibrated directly in terms of azimuth, since this time separation is a known function of azimuth. That is broadly the function also of the bearing indicator of application Serial No. 575,290 and in order to more adequately explain the improvements in the bearing indicator of the present invention, reference is now made to both Fig. 1 and Fig. 2. In the indicator of Fig. 1, the length of the phantastron gate is varied according to the position of the shaft upon which the bearing indicator 64 is mounted. It is the length of this gate that determines the number of pulses that fall within the early and late gates. In the present system, this phantastron gate does not directly determine the time of the early and late gates but rather is an ambiguity resolver in that it selects the correct pulse from phase shifter 47 which in turn controls the time of occurrence of the early and late gates. The advantages of the present system over that of application Serial No. 575,290 lie in the increase in sensitivity obtained through the use of step-up gears 65 which rotate the phase shifting element of phase shifter 47. Since the gears 65 in effect amplify the shaft rotations, fractions of complete rotations of the shaft are more readily detected. For example, if the shaft rotates through 3°, the movable element of potentiometer 52 moves only 3° and there is not much change in the output from this potentiometer to affect the length of the gate of phantastron 51. However, assuming the step-up arrangement of gears 65 is ten, phase shifter 47 then produces a 30° phase shift in the output of suppressed oscillator 46. Of course, a 30° change is much more discernible than a 3° change and for that reason the output of phase shifter 47 is more accurately the correct measurement of the rotation of the shaft. Of course with the addition of the step-up gears, ambiguity is introduced inasmuch as there is a 360° phase shift from phase shifter 47 several times during a single rotation of the dial of bearing indicator 64. To resolve this ambiguity, phantastron 51, gate generator 53 and coincidence circuit 49 are required. These circuits produce a gate in the vicinity of time when the correct pulse should occur and since the gate from gate generator 53 is only long enough to enable one pulse from multiar 48, the correct pulse is selected by this circuit. Due to the increased accuracy of using the output of multiar 48 as compared to a pulse coincident with the termination of the phantastron gate as in application Serial No. 575,290, the time separation of the input pulses which corresponds to the bearing of the receiver can be more accurately measured.

The components of the indicator of Fig. 1 have been shown only in block diagram form since there are many circuts suitable for each component and they are all well known in the art. Also, specific circuits for most of these components are disclosed in application Serial No. 575,-290. It is to be realized that many variations are possible in the disclosed indicator whereby the necessary wave forms of Fig. 2 can be obtained; for example, a phase shifter could be used instead of phantastron 51.

Obviously many modifications and variations of the present invention are possible in the light of the above teachings. It is therefore to be understood that within the scope of the appended claims the invention may be practiced otherwise than as specifically described.

What is claimed is:

1. Distance measuring equipment including a receiver, said receiver having an azimuth indicating circuit comprising: a first terminal for connection to said distance measuring equipment to have raw video impressed thereon; a second terminal for connection to said distance measuring equipment to have decoded video impressed thereon; a delay line connected to said first terminal; a first decoder circuit having two inputs one of which is joined to said second terminal and the other of which is coupled to the output of said delay line for producing an output pulse upon coincidence of pulses in the two inputs; a first gate generator for producing a gate of predetermined length upon being pulsed by the output of said first decoder circuit; an oscillator for producing an output sine wave upon being energized by the gate from said first gate generator; a phase shifter having a movable element for phase shifting said sine wave from said oscillator as a function of the displacement of said movable element; pulse producing means connected to the output of said phase shifter for producing a pulse each time said phase shifted sine wave passes through a predetermined portion of its cycle; a potentiometer circuit having a movable element for producing an output voltage which is a function of the displacement of said movable element; a phantastron fed by a pulse output of said first decoder and the output from said potentiometer for initiating a square wave upon being pulsed by the output of said first decoder, the length of this square wave being determined by the voltage fed from said potentiometer; a second gate generator for initiating a gate upon the termination of the square wave from said phantastron, the length of said gate being less than the period of the sine wave from said oscillator; a coincidence circuit fed by said gate from said second gate generator and the pulses from said pulse producing means for producing an output pulse each time a pulse is coincident with a gate; a second decoder circuit having two inputs, one of which is connected to said first input terminal and the other of which is joined to the output of said delay line for producing an output pulse upon coincidence of pulses in the two inputs; a gate circuit for initiating an early gate of predetermined length upon being pulsed by a pulse from the output of said coincidence circuit; an early gate coincidence circuit fed by said early gate and the pulses from said second decoder circuit for passing those pulses that are coincident with said early gate; a motor having windings; a first motor driver for shaping and feeding the pulses from said early gate coincidence circuit to cause the armature of said motor to rotate in one direction; a differentiator fed by said early gate for producing a pulse that is the differential of said early gate; a late gate coincidence circuit fed by pulses from said second decoder circuit and the differentiated gate from said differentiator for passing those pulses that are coincident with said differentiated gate; a second motor driver fed by the passed pulses of said late gate coincidence circuit for energizing the windings of said motor for causing said armature to rotate in the direction opposite from said one direction; a search control circuit for energibing said first motor driver in the absence of signals from said second motor driver; a shaft connected between the armature of said motor and a movable element of said potentiometer; a bearing indicator mounted on said shaft; and a step-up gear arrangement interconnecting the elements of said potentiometer and phase shifter whereby the movable element of said phase shifter rotates at a multiple speed and displacement of the rotation of the movable element of said potentiometer.

2. Distance measuring equipment including a receiver, said receiver having an azimuth indicating circuit comprising: a first terminal for connection to said distance measuring equipment to have raw video impressed thereon; a second terminal for connection to said distance measuring equipment to have decoded video impressed thereon; means connected to said second terminal for producing an output reference pulse whenever a pair of pulses on said second terminal have a certain time of separation; means energized by each of said reference pulses for producing a sine wave of a predetermined duration; a phase shifter responsive to a shaft input for producing a phase shift in said sine wave as a function of the displacement of the shaft input; pulse producing means for producing a pulse each time that the phase shifted sine wave passes through a predetermined portion of its cycle; means responsive to a shaft input for producing a voltage whose magnitude is a function of the displacement of said shaft input; means responsive to said reference pulses and the voltage of said voltage producing means for initiating a square wave coincident with each reference pulse, the time duration of which is a function of the magnitude of said input voltage; a gate generator for initiating a gate upon the termination of said square wave, the duration of said gate being no longer than the period of said sine wave; a coincidence circuit for passing those pulses from said pulse producing means that are coincident with said gate; a gate circuit for initiating an early gate of predetermined length upon being pulsed by a passed pulse from said coincidence circuit; means connected to said first input terminal for producing a pulse whenever a pair of pulses on said first input terminal have a certain time separation; a motor having windings and an armature; means responsive to said early gate and the pulses from said means connected to said first terminal for passing those pulses coincident with said early gate and shaping them to energize said motor windings to cause said armature to rotate in one direction; a differentiator fed by said early gate for producing a late gate that is the differential of said early gate; means for passing pulses from said means connected to said first terminal that are coincident with said differentiated gate and for shaping these passed pulses to energize said motor windings to cause said armature to rotate in a direction opposite from said one direction; a shaft interconnecting the armature of said motor with the shaft input to said voltage producing means; a bearing indicator mounted on said shaft to indicate the position of the said shaft; step-up gears interconnecting the shaft input of said voltage producing means and the shaft input of said phase shifter.

3. The azimuth indicating circuit of claim 2 and means responsive to the signals fed to said motor windings for causing said motor armature to rotate in one direction in the absence of signals fed to said motor windings.

4. Distance measuring equipment including a receiver, said receiver having an azimuth indicating circuit comprising: a first terminal for connection to said distance measuring equipment to have raw video impressed thereon; a second terminal for connection to said distance measuring equipment to have decoded video impressed thereon; means connected to said first and second terminals for producing a reference pulse each time a pair of pulses on said second terminal has a certain time separation; means connected to said first terminal for producing a decoded pulse each time a pair of pulses on said first terminal has a certain time separation; means having a shaft input for producing a train of pulses of predetermined length upon being pulsed by a reference pulse and wherein the time of occurrence of said train of pulses from said reference pulse is a function of a displacement of said shaft input; means for producing a voltage whose magnitude is a function of a shaft input; means responsive to said voltage and said reference pulses for producing a gate of predetermined length a time after each reference pulse determined by the magnitude of said voltage; means for passing those individual pulses of said train of pulses that are concident with said gate; means fed by said passed pulses for producing an early gate of predetermined length and a late gate of predetermined length immediately after the termination of the said early gate; a motor having windings and an armature; means responsive to said early gate and said decoded pulses for energizing said motor windings with a voltage having a magnitude corresponding to the number of decoded pulses that are coincident with said early gate and of a polarity to cause said motor armature to rotate in one direction; means responsive to said late gate and said decoded pulses for producing a voltage to energize said motor windings having a magnitude corresponding to the number of decoded pulses that are coincident with said late gate and having a polarity to rotate said motor armature in a direction opposite from said one direction; a shaft interconnecting the armature of said motor with the shaft input of said voltage producing means; a bearing indicator mounted on said shaft to indicate the position of said shaft; and a step-up gear arrangement interconnecting the shaft input of said voltage producing means and the shaft input of said pulse producing means.

5. Distance measuring equipment including a receiver, said receiver having an azimuth indicating circuit comprising: means responsive to the decoded video of said distance measuring equipment for producing a reference pulse for each group of decoded video pulses, means responsive to the raw video of said distance measuring equipment for producing a single decoded pulse for each pair of pulses in said raw video having a predetermined time separation; a motor having windings and an armature; means responsive to each of said reference pulses and a number of degrees which is a multiple of the angular displacement of said motor armature for producing a predetermined number of pulses the time of occurrence of each individual pulse from the initiating reference pulse being determined by said number of degrees; means responsive to the rotation of said motor armature and said reference pulses for individually gating said predetermined number of pulses at a predetermined time after the occurrence of each reference pulse that is determined by the angular displacement of said motor armature; means energized by said gated pulses and said decoded pulses for initiating an early gate of predetermined length coincident with the occurrence of a gated pulse and a late gate of the same length upon the termination of an early gate; means for producing a voltage to cause said motor armature to rotate in one direction as a function of the number of decoded pulses that occur during an early gate and for producing a voltage to cause said motor armature to rotate in the opposite direction as a function of the number of pulses that occur during the late gate; and a bearing indicator mounted to provide an indication of a position of the armature of said motor.

References Cited in the file of this patent

UNITED STATES PATENTS

| | | |
|---|---|---|
| 2,449,982 | De Rosa | Sept. 28, 1948 |
| 2,803,821 | Pickles | Aug. 20, 1957 |